July 22, 1924.
R. GREENWOOD
APPARATUS FOR BAKING OR DRYING SUBSTANCES AT HIGH TEMPERATURES AND FOR SUBSEQUENTLY COOLING SAME
Filed Dec. 6, 1921
5 Sheets-Sheet 1

1,502,186

July 22, 1924.

R. GREENWOOD 1,502,186

APPARATUS FOR BAKING OR DRYING SUBSTANCES AT HIGH
TEMPERATURES AND FOR SUBSEQUENTLY COOLING SAME

Filed Dec. 6, 1921

Inventor
Rowland Greenwood,
By A. Singer,
Atty

July 22, 1924.  
R. GREENWOOD  
APPARATUS FOR BAKING OR DRYING SUBSTANCES AT HIGH TEMPERATURES AND FOR SUBSEQUENTLY COOLING SAME  
Filed Dec. 6, 1921  
1,502,186  
5 Sheets-Sheet 4

Inventor.  
Rowland Greenwood,  
By B. Singer,  
Atty.

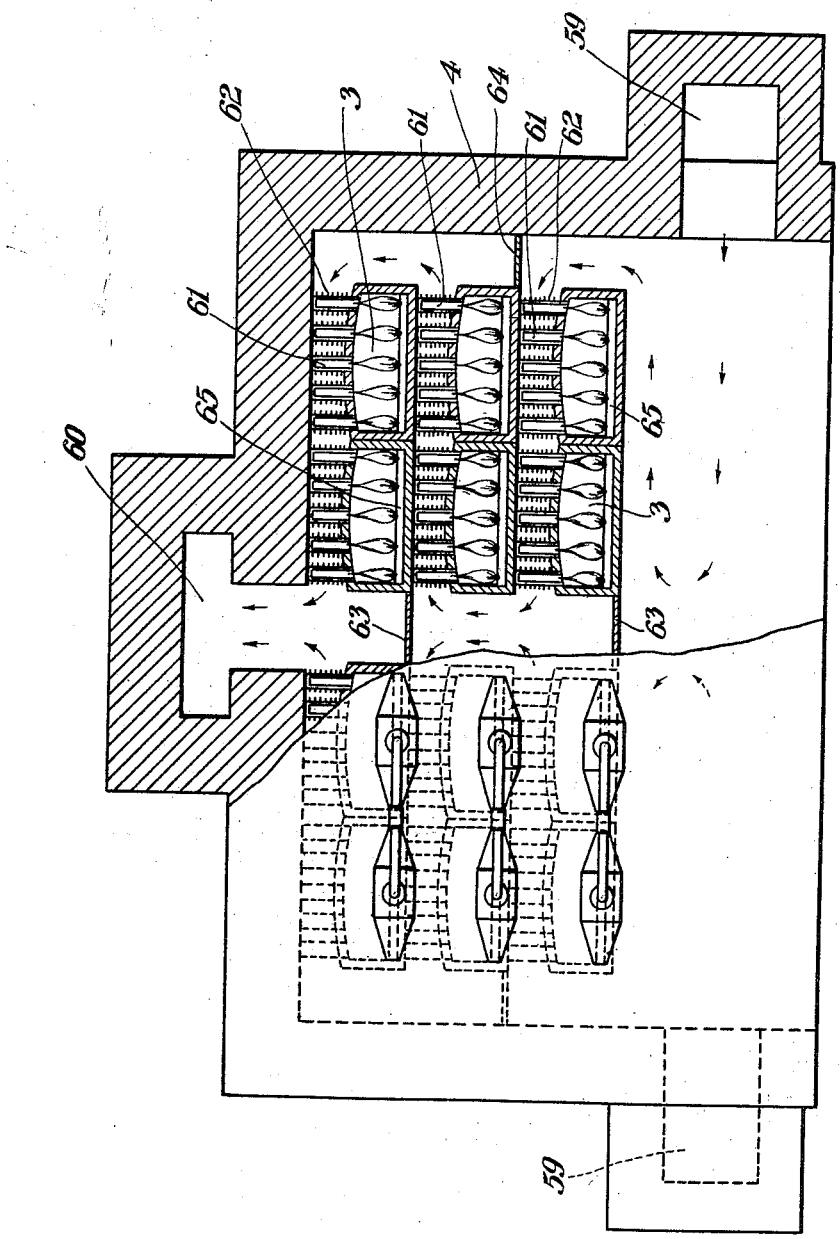

Patented July 22, 1924.

1,502,186

UNITED STATES PATENT OFFICE.

ROWLAND GREENWOOD, OF CARLISLE, ENGLAND, ASSIGNOR OF ONE-HALF TO CARR & COMPANY LIMITED, OF CARLISLE, ENGLAND, A BRITISH COMPANY.

APPARATUS FOR BAKING OR DRYING SUBSTANCES AT HIGH TEMPERATURES AND FOR SUBSEQUENTLY COOLING SAME.

Application filed December 6, 1921. Serial No. 520,377.

*To all whom it may concern:*

Be it known that I, ROWLAND GREENWOOD, a subject of the King of Great Britain and Ireland, residing at 4 Morton Terrace, Wigton Road, in the city of Carlisle, county of Cumberland, England, have invented a new and useful Apparatus for Baking or Drying Substances at High Temperatures and for Subsequently Cooling Same, of which the following is a specification.

This invention relates to apparatus for drying or baking substances, such for example as biscuits for food, at high temperatures and has for its object to provide an oven and cooling tower adapted to co-operate automatically in dealing continuously with the substances under treatment and to provide further an improved system for supplying air for heating and cooling to the oven and cooling tower respectively.

According to the invention substances to be baked or dried are caused to ascend in continuous succession through an air heated oven and to descend through a cooling tower at a slower speed. Heated air is supplied to the oven through a number of inlets independently controllable whilst the air circulation through the cooling tower is arranged in such a manner that an air lock is formed around the point at which the baked or dried substances are transferred automatically from the oven to the cooling tower.

One embodiment of the invention is illustrated in the accompanying drawings in which:—

Figure 7 is a sectional elevation through the heater for supplying hot air to the oven.

Figure 1:
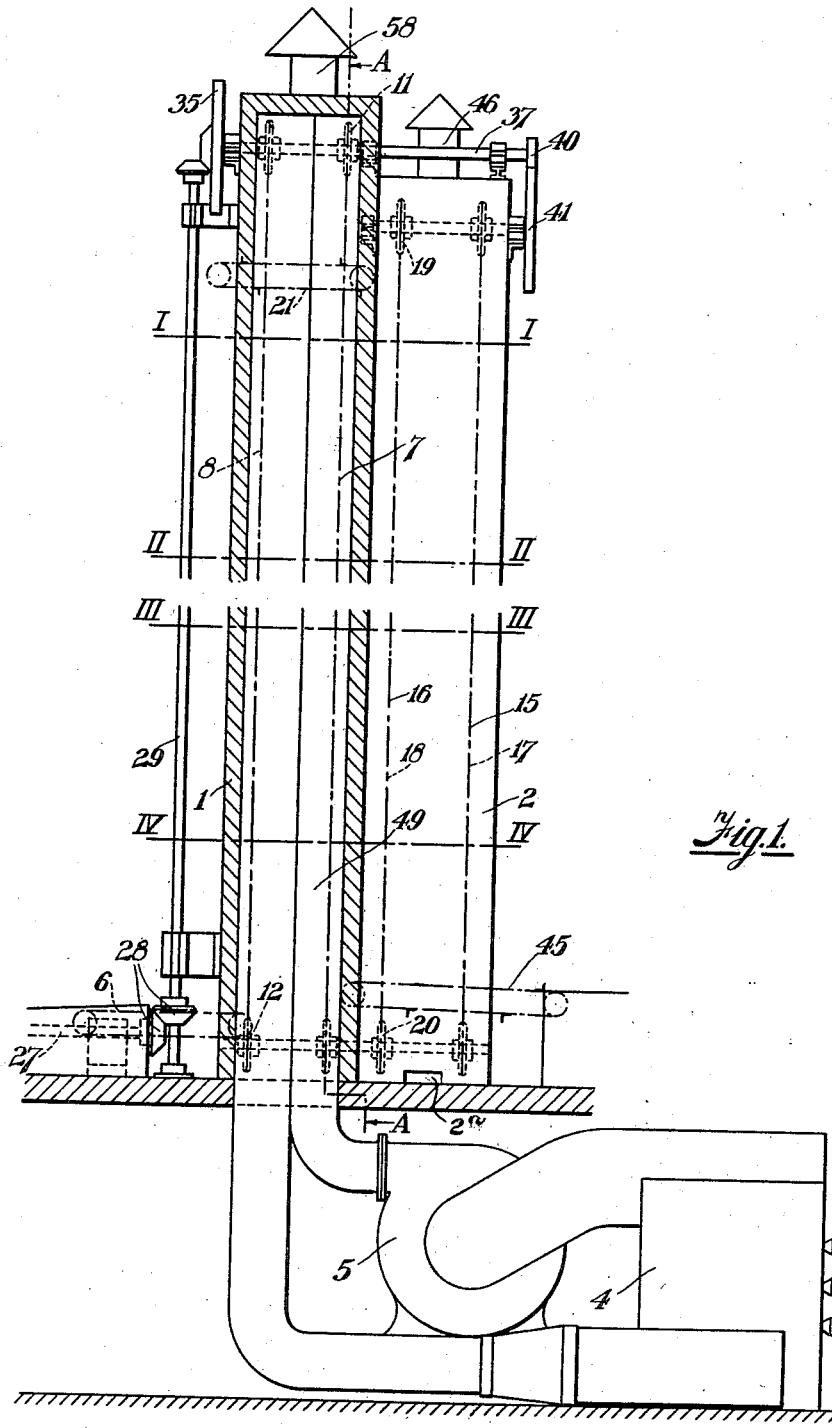
Figure 1 is a general sectional elevation showing the oven, cooler and air circulation arrangements.

The main component parts of the apparatus comprise an oven 1, a cooling tower 2, an air heater 4 and a fan 5 for air circulation.

The oven and cooling tower each consist of an insulated sheet iron cased tower the insulation being less in the case of the cooling tower than in that of the oven. The substance to be treated is conveyed in pans or trays by suitable feeding gear of the endless conveyor type shown diagrammatically at 6, Figure 1, into the base of the oven tower 1 where each tray is engaged by lifting gear adapted to convey it to the top of the oven. In the arrangement illustrated, the lifting gear comprises four endless chains or belts 7, 8, 9 and 10 operated by sprocket wheels 11 at the top of the oven and passing around sprocket wheels 12 at the base thereof. The chains 7 and 8 are provided throughout their lengths with angle irons 13 horizontally arranged to connect the two chains. The chains 9 and 10 are similarly fitted and the projecting portions of the pairs of angle irons provide supports or shelves for trays 14 of substances to be dried or baked as the latter are fed in to the oven by the conveyor 6. As the chains move in the direction of the arrows C a continuous succession of trays 14 will pass through the oven each being supported on a pair of angle irons 13.

The cooling tower 2 is arranged internally in a manner similar to the oven with endless chains 15, 16, 17 and 18 rotated in a direction contrary to the chains 7—10 by sprocket wheels 19 at the top of the tower and passing around sprocket wheels 20 at the base of the tower.

As the trays 14 approach the top of the oven they are transferred one by one to the cooling tower by change over gear now to be described. Two endless conveyors 21 preferably in the form of sprocket chains, move horizontally in the direction indicated by the arrow D Figure 4, between the chains 7, 8 and 9, 10. The chains 21 are also connected by equidistantly spaced angle irons 22, in the present instance four being employed, the projecting portions of which engage the edges of trays 14 remote from the cooling tower and push the trays into the latter on to angle irons 23 which are carried by chains 15, 16 and 17, 18 respectively, the trays thereafter being lowered through the cooling tower. The conveyors 21 are actuated by sprocket wheels 24. As the trays are transferred from oven to cooler the movement imparted to them will be arrested by the outer wall 25 of the cooler, any rebound of a tray will be taken by the inclined edge 26 of the insulated wall dividing the oven from the cooler. When conditions require the speed of the conveyors in the cooling tower to be slower than that of those in the oven as described hereinafter the number of angle irons employed will be greater in the cooling tower and they will be disposed closer together.

Figure 4:
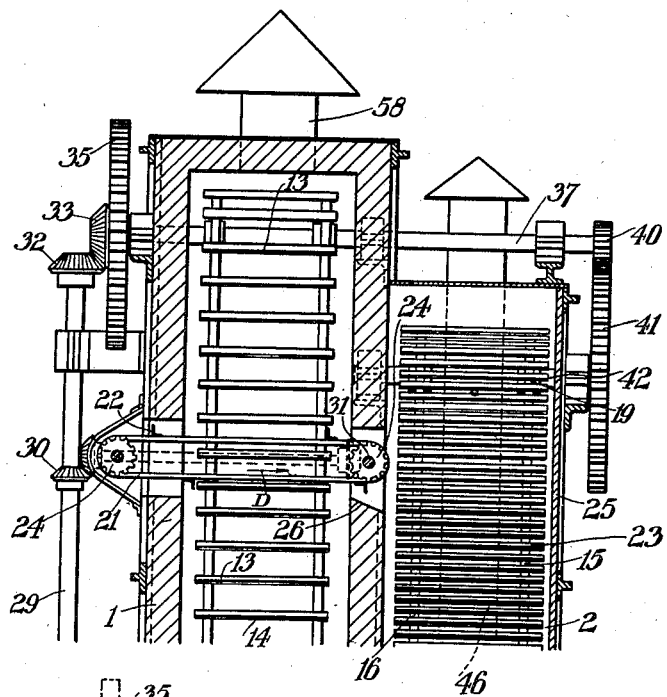
Figure 4 is a sectional elevation through the oven and cooling tower taken on the line B—B of Figure 3.

The conveying arrangements above described are driven from a main power shaft 27 actuating through bevel gears 28 a vertical shaft 29 carried in suitable bearings mounted on one side of the oven. This shaft 29 carries a bevel gear 30 from which the driving shaft 31 for the change over gear is operated. On the shaft 31 are mounted the pair of sprocket wheels 24 which is nearer the cooling tower 2 (Figure 4).

At the upper end of shaft 31 is mounted a bevel gear 32 meshing with a second bevel gear 33 fast on a horizontal shaft 34 carried in bearings on the side of the oven. This shaft 34 carries a spur wheel 35 meshing with a second spur wheel 36 mounted on a shaft 37 parallel to the shaft 34 and passing through the top of the oven and extending across the top of the cooling tower. A third spur wheel 38 equal in diameter and number of teeth with the wheel 36 is mounted on a shaft 39 and meshes with the said wheel 36. The shafts 37 and 39 carry the sprocket wheels 11 which drive the oven conveyor chains 7, 8, 9 and 10.

On the end of shaft 37 remote from the spur wheel 36 is mounted a pinion 40 meshing with a spur wheel 41 mounted on a shaft 42 which carries one pair of the sprocket wheels 19 by which the cooling tower conveyor chains 15, 16, 17 and 18 are driven. The second pair of sprocket wheels 19 is mounted on a shaft 43 on the end of which is carried a spur wheel 44 similar in all respects to the wheel 41 and meshing therewith. The gear ratio between the spur wheel 41 and pinion 40 being in the present instance 3 to 1, it follows that the trays 14 will be caused to descend the cooling tower at one-third the speed of their ascent through the oven. The speed ratio, however, can be varied in accordance with the substances to be treated in the oven, different classes of biscuits for example requiring different treatment in cooling.

At the base of the cooling tower is disposed a pair of endless conveyors 45 similar in construction and operation to the change over gear already described and by means of which the trays 14 are removed from the cooling tower and delivered to any suitable arrangement for conveying the dried or baked products to storage.

Having described the mechanical arrangements by which substances to be dried or baked are progressed through the oven and cooling tower, the means employed for heating and circulating air will now be described.

Air for circulation through the oven 1 is heated in a heater which may comprise (Figure 7) a number of conduits 3 of substantially rectangular cross section extending through an insulated casing 4. Air entering through inlets 59 in the base of the casing passes across the tops of the conduits 3 to an outlet 60 communicating with the interior of the oven 1. Each conduit is formed with a curved upper surface from which project a number of heat distributing members 61, the exterior of each of which is grooved or provided with fins 62. These conduits are disposed preferably in two groups as shown, each group consisting of a number of superimposed pairs of conduits. The air to be heated is compelled to take a tortuous path in ascending owing to baffles 63 disposed between the conduits in the two groups and baffles 64 alternating with the baffles 63 and disposed between the conduits and the walls of the heater.

Within each conduit 3 are disposed rows of burners 65, when gas or oil is used as the heating medium, each jet being disposed preferably vertically beneath one of the heat distributors 61. One end of each conduit is adapted for the entry of air for combustion by forced draught or induction whilst the opposite end is connected to a flue for the outlet of gases of combustion.

By making the conduits deeper in relation to their width and inserting fire bars, hard fuel can be employed whilst the construction of the conduits is such that it readily lends itself to heating by electrical means.

Figure 5:
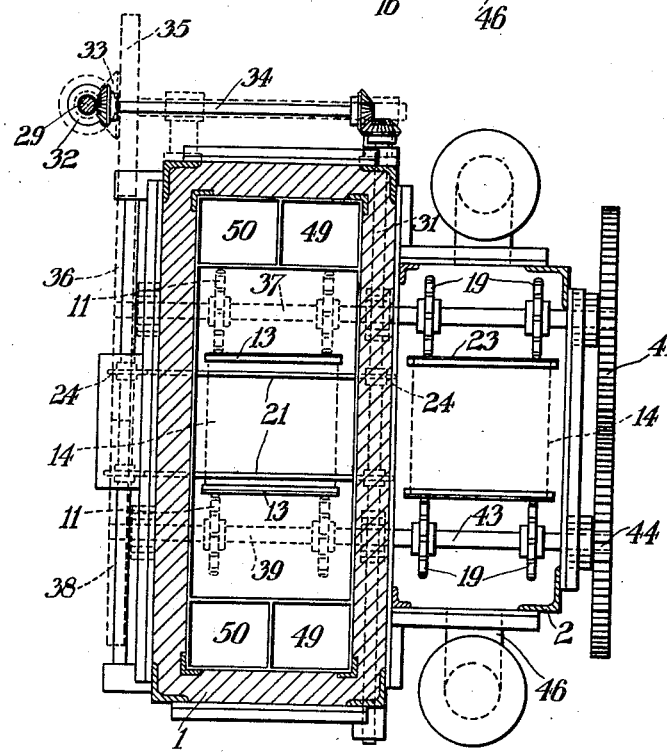
Figure 5 is a plan corresponding to Figure 4 with the tops of the oven and cooling tower removed.

In the arrangement illustrated the outlet 60 delivers heated air to one or more air trunks formed within the oven 1. In the present instance two inlet trunks or sections 49 are employed disposed diagonally and alternately with two exhaust trunks 50 connected to the inlets 59 in the base of the heater, a continuous circulation through these trunks being maintained by the fan 5 which is placed in an inlet duct connected to both trunks 49. These inlet and exhaust trunks are shown in elevation in Figures 1 and 2 and in cross section in Figure 5. Heated air escapes from the trunks 49 by way of inlet openings 51 to the central portion of the oven through which the trays 14 are caused to pass. The inlets 51 are controlled by baffles 48 operated from the exterior of the oven.

The heated air after leaving the inlets 51 is caused to pass directly across the substances to be baked or dried disposed on the trays 14. This action is effected by deflectors or louvres 52 (see Figure 2) disposed in sets adjacent each air inlet 51 and between the ascending and descending sections of each of the chains 7, 8, 9 and 10. By arranging for the independent manipulation of each set of louvres from a point external to the oven, top or bottom heating can be applied as desired to the trays as they ascend.

Air which has given up its heat to the substance under treatment returns through opening 50ª through the exhaust trunks 50 to the heater 4 a constant circulation being maintained by the fan 5.

A draught of cool air is caused to enter the cooling tower at its base as through openings 2ª, one of which is shown in Figure 1, and becomes gradually heated as it ascends, the heated air leaving the tower through outlets 46. These outlets are arranged below the point at which the trays 14 are transferred from the oven to the cooling tower and in this manner a body of residual air fills the top of the cooling tower constituting an air lock to prevent escape of hot air from the oven.

The cooling arrangement described above is particularly advantageous in cooling biscuits baked in the oven as the biscuits nearest the delivery end (the base) of the cooling tower will receive the full cooling effect of the incoming air whilst the biscuits higher up the tower will get the benefit of the tempered air. In this manner cracking of biscuits through harsh or too sudden cooling will be avoided.

Figure 2:
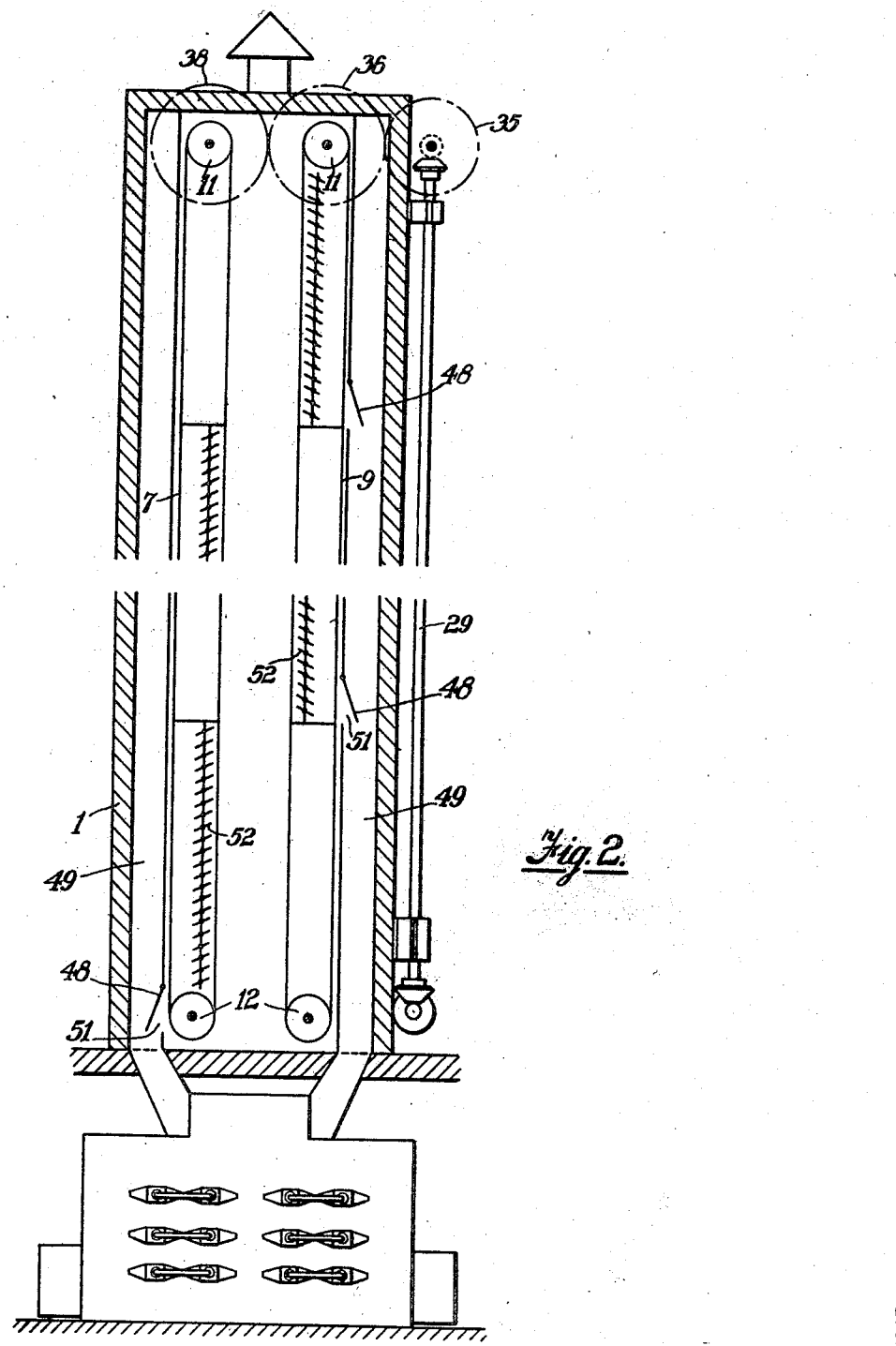
Figure 2 is a sectional elevation taken on the line A—A Figure 1.
Figure 3:
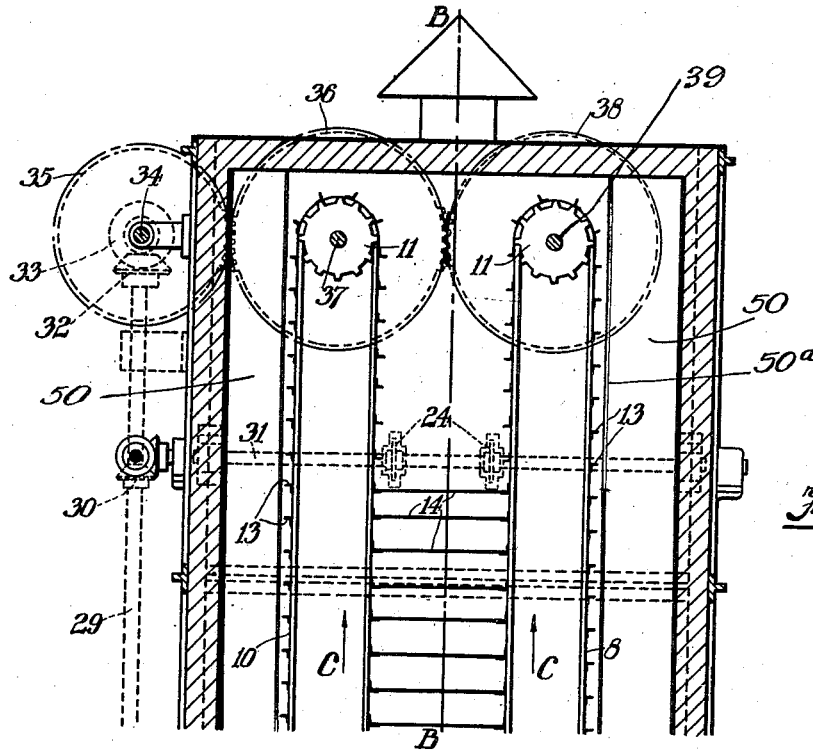
Figure 3 is a sectional elevation on a scale larger than the preceding figures showing the means for raising the substance under treatment through the oven.

For the purpose of controlling the temperature of the oven and ensuring that its moving contents are exposed to the correct temperature at different points it has been found convenient to divide the oven into a number of sections such as those indicated by the lines I—I, II—II, III—III and IV—IV in Figure 1 each of these sections containing one of the sets of louvres shown in Figure 2. The number of control sections will vary in accordance with the size of the oven and the purpose for which it has to be used.

Figure 6:
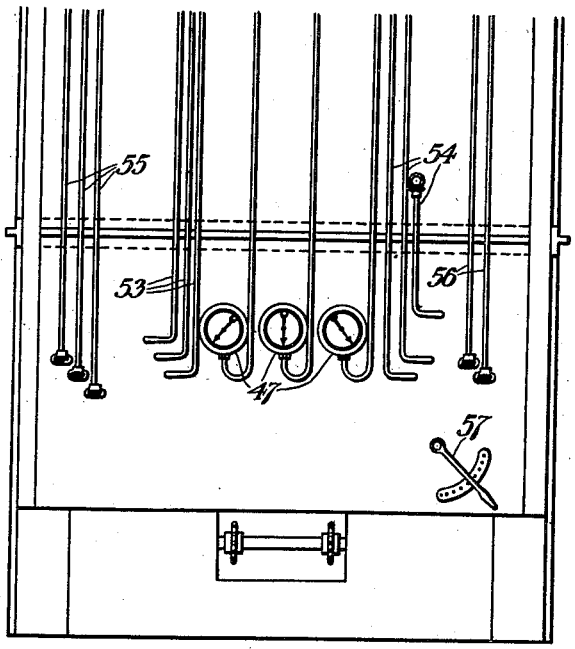
Figure 6 is a view showing the relative positions of the various controls on the exterior of the oven.

The controlling gear is shown in Figure 6 wherein 47 indicates a group of gauges connected with pyrometers disposed at different points in the height of the oven. According to the temperatures indicated by these gauges, the baffles 48 and louvres 52 are adjusted. 53 indicates the operating rods for the louvres disposed in the upper sections and 54 similar rods for the louvres in the lower sections. 55 indicates the operating rods for the baffles 48 in the upper sections, 56 similar rods for the baffles in the sections next below and 57 a handle for operating the lowermost baffle. The oven may be provided also with a vent 58 at the top for the escape of any excess moisture caused by the evaporation of liquids in the oven.

In applying the invention to the baking of biscuits a great saving in space and labour is effected besides carrying out the operations of baking and cooling at a greater speed than has been the case hitherto.

In this case the delivery conveyor may be geared in ratio with the oven conveyors so that the biscuits pass direct from the cutting machine to the oven and through the latter and the cooling tower entirely by mechanical operation. It will be understood that modifications may be made in the details of the arrangements described without departing from the invention. For example, instead of the conveying gear in the oven and cooling tower comprising four endless chains or belts, six may be used in each case. This enables better provision to be made against breakdown as the apparatus would continue to function if one chain became broken or otherwise put out of action.

I claim:—

1. A baking apparatus comprising an oven, means causing substances to be baked to ascend through said oven, means for controlling the temperature of said oven at various points, a cooling tower, means causing baked substances to descend said tower, and means causing the temperature of said tower to decrease towards its base.

2. A baking apparatus comprising an oven, an air heater, a plurality of inlets for heated air in said oven, means rendering said inlets independently controllable, means for conveying substances upwards through said oven, a cooling tower, means for automatically transferring baked substances from the oven to said cooling tower, and means in the base of said tower for introducing cooling air.

3. A baking apparatus comprising a vertical oven, an air heater, a plurality of inlets for heated air in said oven, means rendering said inlets independently controllable, conveying means maintaining continuous movement within said oven of the substances to be treated, independently controllable means for deflecting hot air on the substances under treatment, a cooling tower, means for transferring baked substances from said oven to said cooling tower, means for maintaining continuous movement within said cooling tower of the baked substances, and means for cooling said baked substances gradually in said cooling tower.

4. A baking apparatus comprising an insulated vertical oven, an air heater, a plurality of independently controllable inlets in said oven connected with said heater, exhaust outlets from said oven to said heater, means adapted to convey a series of trays bearing substances to be treated through said oven, a cooling tower disposed adjacent said oven, means for transferring said trays from said oven to said tower and preventing entry of heated air to said tower, and means for progressively cooling the substances under treatment as said trays pass through the tower.

5. A baking apparatus comprising an insulated oven, an air heater, a plurality of independently controllable inlets in said oven connected with said heater, exhaust outlets from said oven to said heater, a plurality of endless conveyors movable vertically through said oven, means carried by the conveyors to support trays bearing the substances to be baked, a cooling tower, an inlet from said oven to the cooling tower, a plurality of endless conveyors movable vertically in said tower, means carried by said conveyors to support said trays, means for automatically transferring trays from the oven to the cooling tower and means for preventing egress of hot air from said oven to said tower at the transfer point.

6. A baking apparatus comprising an insulated oven, an air heater, a plurality of independently controllable inlets in said oven connected with said heater, exhaust outlets from said oven to said heater, a plurality of endless conveyors movable vertically through said oven, means carried by the conveyors to support trays bearing the substances to be baked, a cooling tower, an inlet from said oven to the cooling tower, a plurality of endless conveyors movable vertically in said tower, means carried by said conveyors to support said trays, endless conveyors extending laterally across said oven, means carried by said conveyors for removing trays from the oven conveyors to the cooling tower conveyors and means for preventing egress of hot air through the inlet from the oven to the cooling tower.

7. A baking apparatus comprising an insulated oven, an air heater, a plurality of independently controllable inlets in said oven connected with said heater, exhaust outlets from said oven to said heater, a plurality of endless conveyors movable vertically through said oven, means carried by the conveyors to support trays bearing the substances to be baked, a cooling tower, an inlet from said oven to the cooling tower, a plurality of endless conveyors movable vertically in said tower, means carried by said conveyors to support said trays, endless conveyors extending laterally across said oven, means carried by said conveyors for removing trays from the oven conveyors to the cooling tower conveyors, an inlet for cold air at the base of said cooling tower and an outlet for heated air in said cooling tower at a point below the inlet from the oven to the cooling tower.

8. A baking apparatus comprising an insulated oven, an air heater, a plurality of independently controllable inlets in said oven connected with said heater, exhaust outlets from said oven to said heater, a plurality of endless conveyors movable vertically through said oven, means carried by the conveyors to support trays bearing the substance to be baked, a cooling tower, an inlet from said oven to the cooling tower, a plurality of endless conveyors movable vertically in said tower at a speed slower than those in the oven, means carried by said cooling tower conveyors to support said trays such means being more closely spaced than those carried by the oven conveyors, means for automatically transferring trays from the oven to the cooling tower and means for preventing egress of hot air from said oven to said tower at the transfer point.

9. A baking apparatus comprising an oven, an air heater, means for maintaining a continuous circulation of air through said oven and heater, a cooling chamber, means for maintaining a continuous passage of cold air through said chamber, a power shaft, conveying devices in said oven and cooling chamber and between them and driving connection between said power shaft and conveying devices whereby the cooling chamber conveying devices are driven at a proportionately slower speed than the oven conveying devices.

10. A baking apparatus comprising an oven, an air heater, air inlet trunks and air exhaust trunks in said oven, communications between all of said trunks and the air heater, a plurality of openings in said inlet trunks, independently operable baffles controlling said openings, conveying means maintaining continuous movement within said oven of the substances being baked, independently controllable means for deflecting hot air onto said substances, and a cooling chamber operating in conjunction with said oven.

11. A baking apparatus comprising an oven, an air heater, air inlet trunks and air exhaust trunks in said oven, communications between all of said trunks and the air heater, a plurality of openings in said inlet trunks, independently operable baffles controlling said openings, conveying means maintaining continuous movement within said oven of the substances being baked, a plurality of deflectors disposed adjacent each hot air inlet, independently operable means controlling each set of deflectors, a cooling chamber, conveying means maintaining continuous movement therethrough of substances baked in said oven, and means for causing a continuous movement of cooling air through said chamber.

12. A baking apparatus comprising an oven, an air heater, air inlet trunks and air exhaust trunks in said oven, communications between all of said trunks and the air heater, a plurality of openings in said inlet trunks, independently operable baffles controlling said openings, a plurality of endless conveyors movable vertically in said oven, means carried by the conveyors to support trays bearing the substances to be baked, a cooling tower, an inlet from the oven to the cooling tower, a plurality of endless conveyors movable vertically in said tower, means carried by said conveyors to support said trays, means for automatically transferring trays from oven to cooling tower and means for preventing egress of hot air from said oven to said tower at the transfer point.

13. A baking apparatus comprising an oven, an air heater, air inlet trunks and air exhaust trunks in said oven, communications between all of said trunks and the air heater, a plurality of openings in said inlet trunks, independently operable baffles controlling said openings, a plurality of endless conveyors movable vertically in said oven, means carried by the conveyors to support trays bearing the substances to be baked, a cooling tower, an inlet from the oven to the cooling tower, a plurality of endless conveyors movable vertically in said tower, means carried by said conveyors to support said trays, endless conveyors extending laterally across said oven, means carried by said conveyors for removing trays from the oven conveyors to the cooling tower conveyors and means for preventing egress of hot air through the inlet from the oven to the cooling tower.

14. A baking apparatus comprising an oven, an air heater, air inlet trunks and air exhaust trunks in said oven, communications between all of said trunks and the air heater, a plurality of openings in said inlet trunks, independently operable baffles controlling said openings, a plurality of endless conveyors movable vertically in said oven, means carried by the conveyors to support trays bearing the substances to be baked, a cooling tower, an inlet from the oven to the cooling tower, a plurality of endless conveyors movable vertically in said tower, means carried by said conveyors to support said trays, endless conveyors extending laterally across said oven, means carried by said conveyors for removing trays from the oven conveyors to the cooling tower conveyors, an inlet for cold air at the base of said cooling tower and an outlet for heated air in said cooling tower at a point below the inlet from the oven to the cooling tower.

15. A baking apparatus comprising an oven, an air heater, air inlet trunks and air exhaust trunks in said oven, communications between all of said trunks and the air heater, a plurality of openings in said inlet trunks, independently operable baffles controlling said openings, a plurality of endless conveyors movable vertically in said oven, means carried by the conveyors to support trays bearing the substances to be baked, a cooling tower, an inlet from the oven to the cooling tower, a plurality of endless conveyors movable vertically in said tower at a speed slower than those in the oven, means carried by said cooling tower conveyors to support said trays such means being more closely spaced than those carried by the oven conveyors, means for automatically transferring trays from the oven to the cooling tower and means for preventing egress of hot air from said oven to said tower at the transfer point.

16. A baking apparatus comprising an insulated oven, an air heater means for maintaining continuous air circulation between said oven and heater, means whereby heated air enters said oven through a plurality of controllable inlets, an inlet in the base of said oven, an endless conveyor adapted to deliver trays of substances to be baked through said inlet endless conveying devices movable vertically in said oven, a cooling tower, an endless conveyor for transferring baked substances from said oven to said tower, endless conveying devices movable vertically in said cooling tower, an outlet in the base of said tower, an endless conveyor operating to discharge trays through said outlet, a power shaft and driving connections from said power shaft to all of said conveyor devices.

17. A baking apparatus comprising an insulated oven, means for introducing hot air at a plurality of independently controllable inlets in said oven, a cooling chamber, means for causing currents of cooling air to pass through said chamber means for causing continuous movement of substances under treatment through said oven and cooling chamber, independently operable groups of deflecting devices controlling the circulation of hot air around the substances being baked and exhaust outlets connecting said oven with the source of hot air supply.

18. A baking apparatus comprising an insulated oven, an air heater, air inlet trunks and air exhaust trunks in said oven, communications between all of said trunks and the air heater, a plurality of openings in said inlet trunks, independently operable baffles controlling said openings, a plurality of endless conveyors movable vertically in said oven, supports carried by said conveyors to receive trays of substances to be baked, independently controllable means for deflecting hot air onto the substances to be baked, a cooling tower, means for transferring baked substances automatically from said oven to said tower, and means for preventing escape of hot air from said oven to said tower.

19. A baking apparatus comprising an insulated oven, an air heater, air inlet trunks and air exhaust trunks in said oven, communications between all of said trunks and the air heater, a plurality of openings in said inlet trunks, independently operable baffles controlling said openings, a plurality of endless conveyors movable vertically in said oven, supports carried by said conveyors to receive trays of substances to be baked, independently controllable means for deflecting hot air onto the substances to be baked, a cooling tower, an endless conveyor adapted to transfer said trays from the top of said oven to the top of said cooling tower, a plurality of endless conveyors movable vertically in said cooling tower, supports carried by said conveyors to receive said trays, an inlet for cooling air at the base of said tower, an outlet for heated air near the top of said tower but below the entry from the oven, a power shaft, driving connections between said power shaft and all of said conveying devices whereby the cooling tower conveyors are driven at a speed proportionately slower than that of the oven conveyors and an outlet for moisture at the top of said oven.

20. A baking apparatus comprising an oven, a casing connected to said oven, a plurality of heated conduits disposed within said casing, means causing the passage of air to be heated around said conduits, means for causing a continuous circulation of air through said oven and casing, means for causing substances under treatment to ascend through said oven and a cooling tower operating in conjunction with said oven.

21. A baking apparatus comprising an oven, a casing connected to said oven, a plurality of heated conduits disposed within said casing, a plurality of heat distributing devices projecting from the top of each conduit, means causing air to be heated to pass across the tops of said conduits, means for causing a continuous circulation of air through said oven and casing, a cooling tower adjacent said oven and means causing substances under treatment to ascend through said oven and to descend through said cooling tower.

22. A baking apparatus comprising an oven, a casing adjacent said oven, a plurality of heated conduits having curved upper surfaces disposed within said casing, a plurality of cylindrical heat distributing devices projecting from the top of each conduit, a plurality of air inlets in said oven, a plurality of air outlets in said oven, connections between said inlets and outlets and said casing and a fan interposed in said connections.

23. A baking apparatus comprising an oven, a casing adjacent said oven, a plurality of heated conduits having curved upper surfaces disposed within said casing, a plurality of cylindrical heat distributing devices projecting from the top of each conduit, baffles within said casing to compel air to pass across the tops of said conduits, a plurality of independent controllable air inlets in said oven, a plurality of exhaust outlets in said oven, connections between said inlets and outlets and said casing, a fan interposed in said connections, a cooling tower adjacent said oven and means for conveying substances under treatment through said oven and tower.

24. A baking apparatus comprising an insulated oven, an insulated casing adjacent said oven, a plurality of heated conduits disposed within said casing, means whereby air is caused to circulate around said conduits, a plurality of independently controllable inlets in said oven, a plurality of exhaust outlets in said oven, connections between said inlets and outlets and said casing, a plurality of endless conveyors movable vertically through said oven, means carried by the conveyors to support trays bearing the substances to be baked, a cooling tower, an inlet from said oven to the cooling tower, a plurality of endless conveyors movable vertically in said tower at a speed slower than those in the oven, means carried by said cooling tower conveyors to support said trays, means for automatically transferring trays from the oven to the cooling tower and means for preventing egress of hot air from said oven to said tower at the transfer point.

25. A baking apparatus comprising an oven, air inlet trunks and air exhaust trunks in said oven, a plurality of openings in said inlet trunks, independently operable baffles controlling said openings, conveying means maintaining continuous movement within said oven of the substances being baked, a plurality of deflectors disposed adjacent each hot air inlet, independently operable means controlling each set of deflectors, a casing adjacent said oven, a plurality of heated conduits disposed within said casing, means whereby air is caused to circulate around said conduits, connections between said air inlet and exhaust trunks and said casing, means for maintaining a continuous circulation of air through said oven and casing, a cooling chamber, conveying means maintaining continuous movement therethrough of substances baked in said oven and means for causing a continuous movement of cooling air through said chamber.

26. A baking apparatus comprising an oven, a casing adjacent thereto, a plurality of heated conduits disposed within said casing, a plurality of heat distributing devices projecting from the top of each conduit, means compelling air to pass across the tops of said conduits, a plurality of inlets for heated air in said oven, means for maintaining a continuous circulation of air through said oven and casing, independently controllable means for deflecting hot air onto the substances under treatment and a cooling chamber operating in conjunction with said oven.

In witness whereof I affix my signature.

ROWLAND GREENWOOD.